Figure 1:
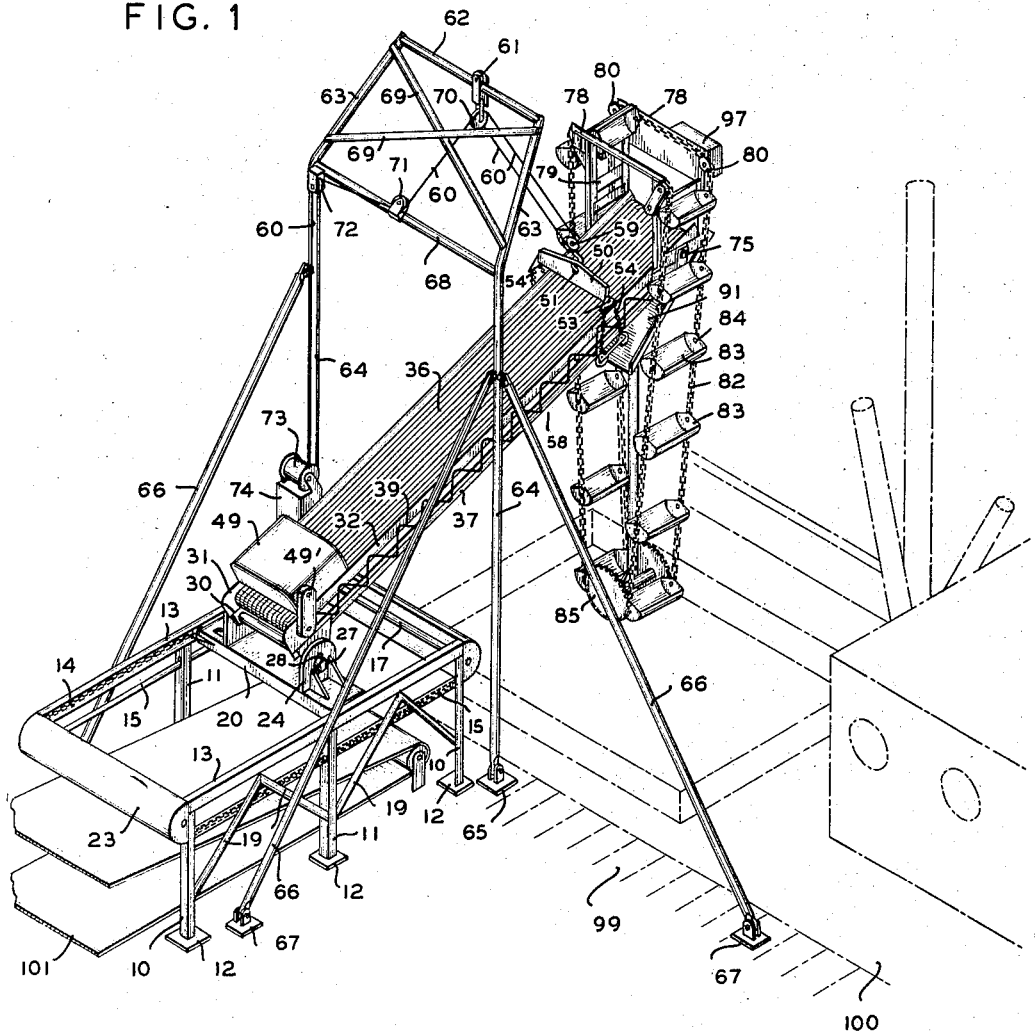

May 5, 1959 W. N. MERRICK 2,885,061
MECHANICAL BOAT UNLOADER
Filed July 15, 1957 3 Sheets-Sheet 1

INVENTOR
W. N. MERRICK
BY A. Yates Dowell
ATTORNEYS

May 5, 1959 W. N. MERRICK 2,885,061
MECHANICAL BOAT UNLOADER
Filed July 15, 1957 3 Sheets-Sheet 2

INVENTOR
W. N. MERRICK
BY A. Yates Dowell
ATTORNEY

May 5, 1959 W. N. MERRICK 2,885,061
MECHANICAL BOAT UNLOADER
Filed July 15, 1957 3 Sheets-Sheet 3

INVENTOR
W.N. MERRICK
BY A. Yates Dowell
ATTORNEYS

United States Patent Office 2,885,061
Patented May 5, 1959

2,885,061

MECHANICAL BOAT UNLOADER

Wallace N. Merrick, Harlingen, Tex.

Application July 15, 1957, Serial No. 671,996

3 Claims. (Cl. 198—89)

This invention relates to the handling of commodities including the movement of the same from one location to another, and particularly to the removal of a load or cargo of shrimp or other material from the hull of a boat to a dock or wharf to permit quick disposition of the same in any desired amount.

In certain industries it is necessary to handle commodities quickly and efficiently so that the product will be available to the consumer in a minimum of time and will not involve more than a minimum of time of humans, vessels, equipment and port facilities, all of which influence the quality, character, and cost of a product.

In the moving of certain perishables such as seafood including, for example, shrimp, clams, oysters and the like, it is desirable that the cargo be handled with the least possible delay so that it be available to the consumer at the peak of freshness and flavor regardless of whether loosely contained within the hold of a boat or packaged. Removal has been slow, at a substantial sacrifice of freshness, flavor and palatability, as well as time consuming for all those involved in addition to the boat, land, vehicle and associated equipment, transportation facilities, amounting to a substantial loss or waste as well as injury and waste of the product.

It is an object of the invention to provide a mechanical boat unloader of relatively simple, inexpensive and durable character, by means of which commodities in bulk, including shrimp, clams, oysters and other products, can be rapidly, continuously and reliably transported from one place to another, including from the hold of a boat to the land and deposited upon a stationary or movable object such as a truck for hauling to a place of consumption or upon a conveyor.

Another object of the invention is to provide mechanical means for picking up shrimp or other substances, conveying the same to a different location, depositing the same onto a conveyor, conveying the shrimp by said conveyor and discharging the same from said conveyor to a location different from that which they were loaded onto the conveyor.

Another object of the invention is to provide a mechanical boat unloader for unloading shrimp or other substances quickly and simply from a boat or other object and having a conveyor with a portion which can be moved horizontally to adapt itself to the difference in distance and elevation between the unloader and the material to be unloaded, as well as a device of this character which can be fixed to a stand or support on a wharf, and nevertheless can be operated so that the outer end of the said conveyor can be moved horizontally and raised or lowered, and with an auxiliary depending conveyor for elevating material from a lower position onto the first conveyor.

Figure 2:
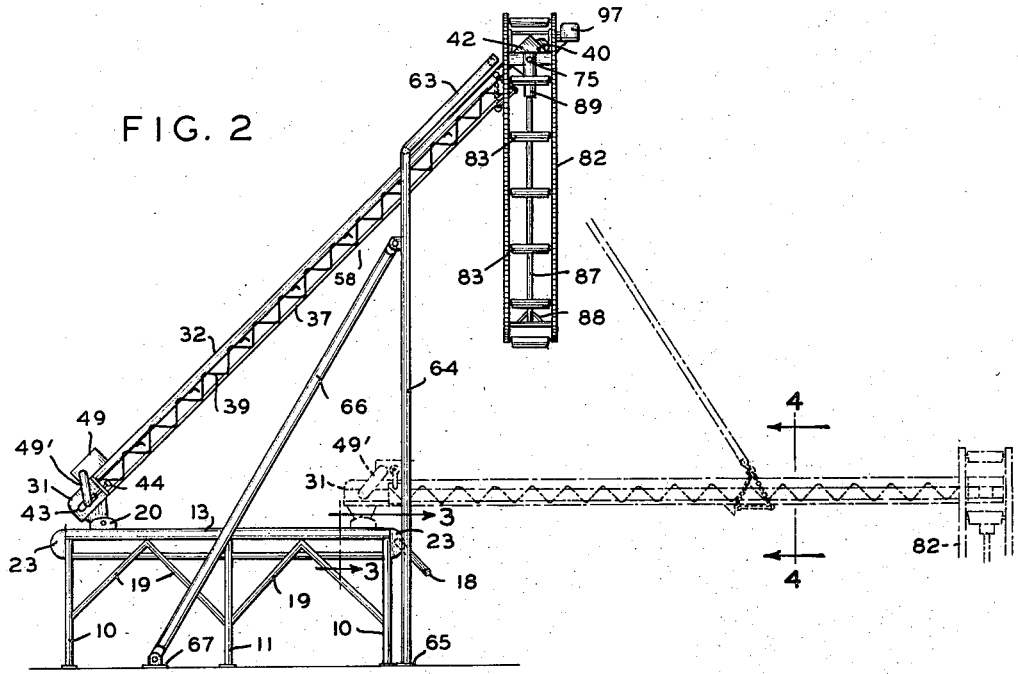
Figure 3:
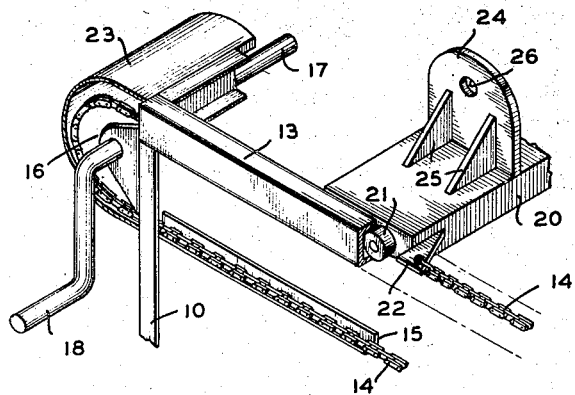
Figure 4:
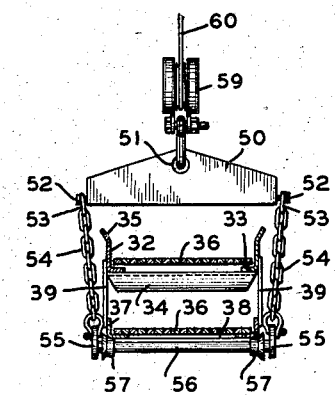
Figure 5:
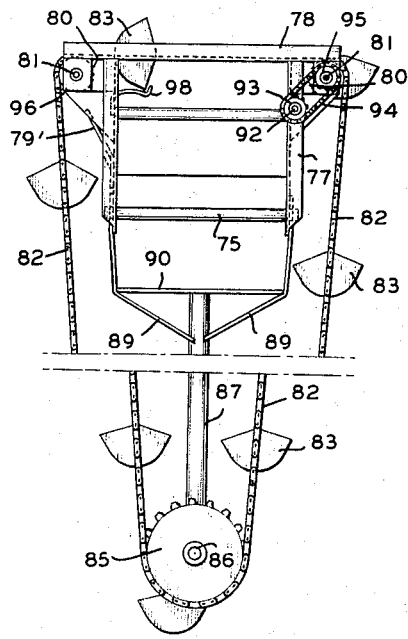
Figure 6:
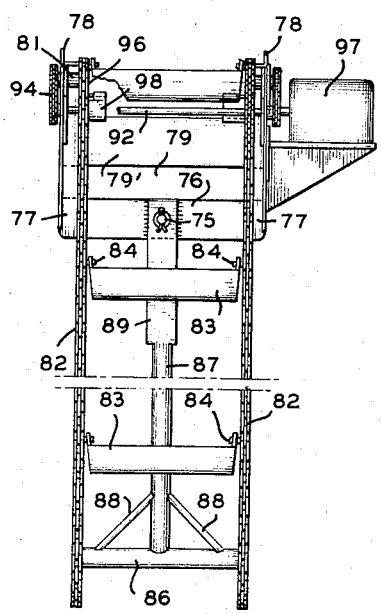
Figure 7:
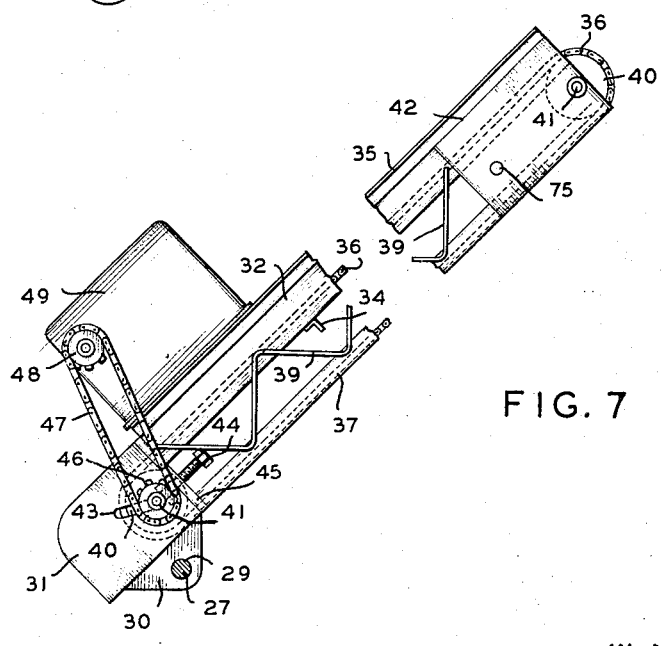

Other objects and advantages of the invention will be apparent from the following description taken in conjunction with the accompanying drawings wherein:

Fig. 1 is a perspective illustrating one embodiment of the invention in connection with a boat to be unloaded;

Fig. 2, an elevation viewed from the right side of the machine;

Fig. 3, a fragmentary detail perspective along substantially the lines 3—3 of Fig. 2 with parts broken away to reveal a portion of the driving mechanism;

Fig. 4, a large fragmentary detail taken substantially on the line 4—4 of Fig. 2;

Fig. 5, a front elevation of the continuous bucket-type elevating system of the present invention;

Fig. 6, a view taken substantially at right angles to that of Fig. 5 and being a side elevation of the continuously operating bucket elevation system; and Fig. 7, a fragmentary side elevation of the belt conveyor and its mounting.

Briefly stated, the present invention is a mechanical boat unloader and comprises a stand adapted to be anchored upon a dock or wharf in a manner to support a conveyor mechanism movable both in a horizontal direction and in a vertical direction for unloading a boat or for conveying material from a variable lower to a higher elevation or from a lower elevation which is subject to the rise and fall of the tide. The conveyor of the present invention has one end reciprocably pivoted on the stand so that it may move in a horizontal direction longitudinally of the table to permit the disposition of the opposite end of the conveyor over the hatch of a boat regardless of beam width. Onto the outer end of the conveyor is pivotally suspended a chain bucket conveyor system so that the conveyor may be moved horizontally and its outer end raised and lowered to bring the bucket conveyor system into the desired proximity to the cargo of a boat or other material to be moved and with motorized means for moving the conveyor relative to the stand on which it is supported and for raising and lowering the outer end of the same and for driving the bucket conveyor system, as well as for causing the tripping of the buckets and discharge of the contents thereof so that they will fall onto the conveyor.

With continued reference to the drawings, the structure of the present invention comprises a stand or table having four legs or corner posts 10, and a pair of intermediate side posts 11, such posts being preferably of angle iron construction for strength and each post being provided with a levelling plate 12. A pair of substantially horizontally disposed spaced inwardly facing parallel channels 13 form a pathway or track for the upper spaced runs of the endless chains 14, the lower runs of which are supported by angle iron members 15, one beneath each of the channels 13.

Each endless chain 14 extends around and is supported by a pair of sprockets 16, the sprockets at the corresponding ends of the chain being supported on transverse shafts 17 at each end of the stand or table, one of which is provided with a crank 18, by means of which the chains may be caused to move.

The bracing of the stand or table is dependent upon the stress to which it is subjected and, if desired, additional braces 19 may be employed between the posts 10 and 11 and the horizontal inwardly facing side channels 13.

The stand or table forms a support for one end of a belt conveyor and for this purpose a movable transverse member or trolley 20 (Fig. 3) is disposed between the inwardly facing side channels 13 and with rollers or other anti-friction devices 21 riding within the opposed channels so that the transverse members or trolleys 20 will move easily along the stand or table. The transverse member or trolley 20 is connected at each end by the chains 14 by means of lugs or attaching elements 22 so that the trolley is carried with the chains. When the shaft 17 is rotated by the crank 18, the sprockets 16 on the shaft 17 will cause the pulley to move within the tracks 13 from one end of the stand to the other. If desired, a guard 23 may be placed at each end of the stand or table for shielding the chains which pass over the sprockets so that nothing will be caught accidentally between the chains and the sprockets.

The trolley or transverse member 20 is provided with a pair of spaced opposed bearing blocks or upright plates 24 having bracing angle blocks 25 so that the bearing blocks will be held in rigid relation on the transverse member or trolley 20. Each upright member 24 is provided with an opening 26 in which is disposed the end of a shaft 27 held in place by means of cotter pins 28. The shaft 27 is journaled in openings 29 in a pair of spaced brackets 30 fixed to a pair of spaced side plates 31 of a conveyor frame including an opposed pair of side members 32 having inwardly extending opposed bed plates 33 connected by transverse angle iron braces 34 which maintain them in fixed spaced parallel relation.

The upper edges of the side plates 32 have outwardly extending edge portions 35 to strengthen and rigidify such plates and between the plates 32 the upper run of a conveyor 36 is supported by the horizontal portions of longitudinally disposed angles 37 connected by cross braces 38, the angle members 33 and 37 at each side being connected by zig-zag side braces 39.

The conveyor belt 36 is supported on cylindrical pulleys 40 mounted on shafts 41, one at each end of the conveyor. These pulleys are located between the end plate 31 at the inner end of the conveyor and between corresponding end plates 42 at the opposite end of the conveyor. The shaft 41 at the inner or discharge end of the conveyor is mounted in slots 43 in the corresponding end plates 31, and conveyor adjusting screws 44 are threaded through lateral flanges 45 and engage opposite ends of the shaft 41 for tensioning the conveyor. The conveyor may be driven in any desired manner as, for example, by a sprocket 46 fixed on the shaft 41 and driven by a chain 47 from a sprocket 48 connected to the drive shaft of a motor 49, the sprockets and chain being housed in a suitable casing 49'.

The outer end of the conveyor is adapted to be moved both vertically and horizontally and in order to support such outer end a cradle is provided including a yoke 50 having an opening 51 for a suitable support. At each end the yoke 50 is provided with a pin 52 on which is received a hanger or triangular bracket 53 on each end of which is attached a chain 54. Between the lower ends of each pair of chains is mounted a plate 55 and between the opposed plates at opposite ends of the yoke are mounted a pair of shafts 56 each having a pair of flanged wheels 57 located beneath the frame of the conveyor and in contact with the flanges 37 at opposite sides of the conveyor. Thus the conveyor is cradled beneath the yoke upon flanged wheels and such supporting mechanism is movable longitudinally of the conveyor and has limited scope in its inward movement by means of a stop 58 on one of the bed plates 33.

The yoke 50 is supported by a block 59 and tackle 60 and a rollable hanger 61 mounted upon an upper transverse member 62 mounted upon and between the angular portions 63 of a pair of uprights 64, the lower ends of which uprights are pivoted or otherwise attached to supporting plates 65. Braces 66, pivotally attached to supporting plates 67, may be pivoted to the uprights 64 for ensuring the rigidity of the uprights. The angular portions 63 of the uprights may be additionally reinforced by means of a cross member 68 and diagonal braces 69 welded or otherwise secured to the angular portions 63.

To provide for vertical adjustment of the yoke 50, the cable or tackle 60 extends over a pulley 70 carried by the hanger 61 and such tackle is disposed around a second pulley 71 and a fixed pulley 72 attached to one of the uprights 64. An electrically driven winch 73 is mounted on one of the uprights 64 and is employed for raising and lowering the yoke 50, such winch being driven by a motor 74.

In order to raise shrimp or other material from a lower elevation, such as the hold of a boat or the like, suitable elevating mechanism is provided at the outer end of the belt conveyor 36, such elevating mechanism being pivoted on the shaft 75 mounted in the end plates 42. On the shaft 75 is mounted a frame which comprises a pair of opposed bars of plates 76, one centrally pivoted at each side of and parallel to the conveyor 36, and having fixed thereto a pair of arch frames consisting of uprights, posts or legs 77 and a horizontally disposed angle 78 mounted transversely of the conveyor 36 with the lower ends of opposite legs 77 welded or otherwise attached to the corresponding ends of the bars 76 so that the horizontal angle members 78 are located in parallel relation with inwardly extending chain supporting flanges. The spaced legs at each side of the conveyor may be connected by means of additional braces 79 and also deflector plates 79' may likewise be provided located at each side of the conveyor adjacent the outer end of the same so that shrimp or other material discharged downwardly onto the end of the conveyor will be convergingly directed onto the conveyor to be carried along thereby.

The angle 78 of the frame is extended at each side of the conveyor to support a sprocket 80 on a shaft 81 over which a pair of endless chains 82 are disposed with the upper runs of said chains supported upon the opposed flanges of the horizontal frame members 78. A series of buckets 83 are mounted between the spaced pair of chains upon pivots 84 at their upper portions so that the buckets will be maintained in depending position by gravity Upon the lowermost reaches of the parallel chains are disposed a pair of sprockets 85 fixed to a shaft 86 and maintained in fixed relation relative to the shaft 75 by means of a bar 87 with braces 88 at each side. A yoke 89 is fixed to the bar 87 adjacent its upper portion with the ends of said yoke pivoted on the shaft 75 and fixed to the bar 76 so that such yoke and frame rock together as a unit on said shaft.

Across the lower portion of the yoke 89 is fixed a brace 90 adapted to support the intermediate portion of a splash pan deflector or guard 91, the upper end of which is attached by a chain to the outer end of the conveyor. The deflector 91 deflects water or small particles passing through the conveyor to one side of the loading area of the bucket conveyor to prevent water or small particles from falling on anyone in the loading area.

In order to drive the chains 82 which carry the buckets 83, a shaft 92 is mounted along one side of the conveyor on the side posts or legs 77 on opposite ends of which shaft 92 are fixed sprockets 93 which in turn drive chains 94 which drive sprockets 95 on stub or sprocket shafts 81 to which are fixed sprockets 96 which engage the chains of the bucket conveyors. The shaft 92 may be driven in any desired manner as, for example, from the shaft of a motor 97. The buckets 83 are intended to be filled with shrimp or other substances and carried upwardly until they reach maximum elevation whereupon come in contact with a dump lever 98 as shown in Fig. 5, whereupon the contents are dumped and fall by gravity onto the belt conveyor 36 and are carried along to the opposite end of the conveyor where they are discharged onto a further conveyor 101, transfer means, or other thing.

In use the device is mounted upon a dock 99 where shrimp or other substances can be unloaded from a boat 100 regardless of the tide by actuating the motor 74 to operate the winch 73 to unwind or wind the cable which raises and lowers the yoke 50 and the outer end of the belt conveyor supported thereby. The outer end of the belt conveyor can be adjusted horizontally with the trolley 20 to accommodate boats of different beams and by raising and lowering the outer end of the belt conveyor 36 the bucket conveyor will pivot on the shaft 75 and maintain a substantially vertical position at all times and by a suitable control the motor for driving the bucket conveyor can be actuated.

It will be obvious to those skilled in the art that various changes may be made in the invention without departing from the spirit and scope thereof and therefore the invention is not limited by that which is illustrated in the drawing and described in the specification, but only as indicated in the appended claims.

What is claimed is:

1. A mechanical boat unloader comprising a stand adapted to be mounted upon a support, said stand including spaced inwardly facing parallel channels forming a track, a member retained by and reciprocable along said track, a belt conveyor-frame having one end pivoted to said reciprocable member, a belt conveyor carried by said frame, supporting means for the outer end of said belt conveyor for controlling the elevation of the latter, a second conveyor pivoted on the outer end of said conveyor frame and mounted to be located in depending position regardless of the angularity of said belt conveyor, said second conveyor including buckets pivoted adjacent their upper portions so that they will be maintained in position by gravity to retain their contents, means for engaging and dumping each of said buckets when they reach the upper part of their path of travel to discharge the contents onto the outer end of said belt conveyor, and means for producing horizontal movement of said member and said belt conveyor connected thereto, for raising and lowering the outer end of said belt conveyor, and for driving said conveyors.

2. A mechanical boat unloader comprising a stand adapted to be mounted upon a support, said stand including spaced, horizontally disposed, inwardly facing parallel channels forming a track, a member retained by and reciprocable along said track, a conveyor-frame having one end pivoted to said reciprocable member, an endless conveyor carried by said frame, supporting and elevating means operatively connected to the other end of said endless conveyor for controlling the elevation of the latter, a second independent endless conveyor freely pivoted on the other end of said conveyor frame and mounted to be located in depending position regardless of the angularity of said first mentioned endless conveyor, said second conveyor including buckets moving in a path of travel over said first conveyor and pivoted adjacent their upper portions so that they will be maintained in position by gravity to retain their contents, means engageable with each of said buckets for dumping the same when they reach the upper part of their path of travel to discharge the contents onto the outer end of said first conveyor, and independent power transmitting means operatively connected to said member, conveyors, and support means for horizontally adjusting said member, vertically pivoting said first endless conveyor on said reciprocable member for raising and lowering the outer end of said first endless conveyor and independently driving said conveyors.

3. The structure of claim 2 including a third conveyor underlying said belt conveyor for receiving material therefrom.

References Cited in the file of this patent

UNITED STATES PATENTS

| | | |
|---|---|---|
| 1,099,266 | Olson | June 9, 1914 |
| 1,272,150 | Thornton | July 9, 1918 |
| 1,711,157 | Phillips | Apr. 30, 1929 |

FOREIGN PATENTS

| | | |
|---|---|---|
| 437,977 | Great Britain | July 16, 1941 |